US012743378B2

(12) United States Patent
Li et al.

(10) Patent No.: US 12,743,378 B2
(45) Date of Patent: Sep. 22, 2026

(54) ADDRESS RANGE BASED MEMORY HINTS FOR PREFETCHER, CACHE AND MEMORY CONTROLLER

(71) Applicant: Google LLC, Mountain View, CA (US)

(72) Inventors: Xinliang David Li, Palo Alto, CA (US); Tipp James Moseley, Los Altos, CA (US); Christopher Thomas Kennelly, Croton-on-Hudson, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/198,580

(22) Filed: May 17, 2023

(65) Prior Publication Data

US 2024/0385966 A1 Nov. 21, 2024

(51) Int. Cl.
*G06F 12/0862* (2016.01)
*G06F 12/1027* (2016.01)
*G06F 12/126* (2016.01)

(52) U.S. Cl.
CPC ...... *G06F 12/0862* (2013.01); *G06F 12/1027* (2013.01); *G06F 12/126* (2013.01); *G06F 2212/1016* (2013.01); *G06F 2212/6028* (2013.01)

(58) Field of Classification Search
None
See application file for complete search history.

(56) References Cited

U.S. PATENT DOCUMENTS 7,533,242 B1 * 5/2009 Moll .................. G06F 9/30047 711/213
7,949,794 B2 5/2011 Ajanovic et al.
10,229,060 B2 3/2019 Wilkerson et al.
10,346,309 B1 * 7/2019 Hakewill ............ G06F 12/0875
2013/0262779 A1 * 10/2013 Bobba ................. G06F 12/0862 711/E12.001
2016/0054931 A1 * 2/2016 Romanovsky ........ G06F 3/0643 711/103
2016/0054934 A1 * 2/2016 Hahn .................... G06F 3/0679 711/103

(Continued)

FOREIGN PATENT DOCUMENTS

WO 2022269220 A1 12/2022

OTHER PUBLICATIONS

Grant Ayers, Heiner Litz, Christos Kozyrakis, and Parthasarathy Ranganathan. 2020. Classifying Memory Access Patterns for Prefetching. In Proceedings of the Twenty-Fifth International Conference on Architectural Support for Programming Languages and Operating Systems (ASPLOS '20). Association for Computing Machinery, New York, NY, USA, 513-526. https://doi.org/10.1145/3373376.3378498.

(Continued)

*Primary Examiner* — Hosain T Alam
*Assistant Examiner* — Ryan Dare
(74) *Attorney, Agent, or Firm* — Lerner David LLP

(57) ABSTRACT

The disclosed technology may comprise a mechanism that provides address range based memory hints, based on software memory access patterns. The mechanism includes an interface that can be in the form of a new instruction ("mem_range_hint") that includes as operands (i) the start of the virtual address ("start_vaddr"), (ii) memory region size ("size"), and (iii) a hint ("hint") associated with the memory access pattern.

20 Claims, 6 Drawing Sheets

200

(56) References Cited

U.S. PATENT DOCUMENTS

| | | | | |
|---|---|---|---|---|
| 2016/0197986 | A1* | 7/2016 | Chambliss | G06F 9/45558<br>709/213 |
| 2016/0246726 | A1* | 8/2016 | Hahn | G06F 3/0613 |
| 2016/0283210 | A1* | 9/2016 | Bertolli | G06F 8/41 |
| 2019/0004954 | A1* | 1/2019 | Kumar | G06F 12/0862 |
| 2020/0110536 | A1* | 4/2020 | Navon | G06F 3/0616 |
| 2020/0110537 | A1* | 4/2020 | Hahn | G06F 3/061 |
| 2021/0081316 | A1* | 3/2021 | Muthiah | G06F 3/0673 |
| 2021/0248086 | A1* | 8/2021 | Gupta | G06F 12/123 |
| 2022/0413866 | A1* | 12/2022 | Nathella | G06F 9/30047 |
| 2023/0004491 | A1* | 1/2023 | Aga | G06F 12/0238 |
| 2023/0315633 | A1* | 10/2023 | ElSharif | G06F 12/0811<br>711/122 |
| 2023/0350806 | A1* | 11/2023 | Tvila | G06F 12/0862 |
| 2024/0184702 | A1* | 6/2024 | Gouldey | G06F 12/0897 |

OTHER PUBLICATIONS

Sam Ainsworth, “Technical Report 923. Prefetching for complex memory access patterns,” Jul. 2018. University of Cambridge, Computer Laboratory. 146 pages.

Yuan Zeng, “Long Short Term Based Memory Hardware Prefetcher,” May 2017. Lehigh University, Theses and Dissertations. 2901. 41 pages.

Chen Ding and Yutao Zhong, “Reuse Distance Analysis. Technical Report UR-CS-TR-741,” Feb. 2001. University of Rochester, Computer Science Department. 11 pages.

International Search Report and Written Opinion for PCT Application No. PCT/US2023/083808, dated Apr. 29, 2024. 14 pages.

* cited by examiner

100

200

300

400

800

ADDRESS RANGE BASED MEMORY HINTS FOR PREFETCHER, CACHE AND MEMORY CONTROLLER

BACKGROUND

Modern day data processing architectures typically employ cache memories to improve processing speed. A common design employs three levels of cache memories: (1) a last level or level 3 (last level cache (LLC) or L3) cache closest to the DRAM, (2) a level 2 (L2) cache and (3) a level 1 (L1) cache. The L2 cache sits between the L1 and L3 caches. The L3 cache is larger than the L2 cache, and the L2 cache is larger than the L1 cache. Data to be operated on by a central processing unit, processor, or core (generally a processing element) is typically fetched from L1, from L2 if there is a L1 miss, and from LLC/L3 if there is an L2 miss.

Waiting on data is a major source of processing element stalls in processing workloads in a datacenter. A large fraction of those stalls is due to L1/L2 cache misses and memory bandwidth ("membw") contention due to LLC/L3 misses. Cache misses occur when the processing element looks for data in a cache but is unable to find the data it is looking for. For example, a processing element typically first looks for data in the L1 cache. If there is an L1 cache miss, the processing element then looks in the L2 cache. If there is a L2 cache miss, the data may then be fetched from the L3 cache or DRAM (in two level cache schemes).

Cache replacement policies and sophisticated hardware prefetching techniques have been employed to combat high cache miss rate. A hardware prefetcher tries to re-discover memory access patterns at processor runtime (e.g., training), and uses the discovered information to predict the next prefetching address. Accurately predicting the addresses and data to be used can improve various aspects (e.g., speed) of processing data at runtime.

SUMMARY

Aspects of the disclosed technology may include a method, apparatus or system. For example, an aspect of the disclosed technology is a method for processing data in a processing element. The method may comprise determining a starting virtual address and memory access region, the starting virtual address and memory access region defining a memory access range associated with a memory access pattern of a workload being processed by the processing element; determining a plurality of memory address hints associated with the memory address range; and populating one or more memory caches used in processing the data based on one or more of the plurality of memory address hints. In accordance with this aspect of the disclosed technology, determining the starting virtual address and memory access region and determining the plurality of memory address hints are performed using an interface between software associated with the workload and the one or more memory caches.

In accordance with this aspect of the disclosed technology, the plurality of memory address hints may include one or more of: a stride hint indicating a constant data access distance in a data streaming the memory access region, a stream hint indicating a data access stream with reuse distances associated with the memory access region, a code hint indicating a reused code associated with processing the workload, a random access hint indicating random accesses and whether random strides associated with the memory access region are greater than or less than a cache size threshold, a spatial temporal hint indicating a likelihood of accessing neighboring cachelines associated with the memory access region at a later time than a given cache line, or a priority hint indicating a scheduling priority of data associated with a portion of the memory access region.

Further in accordance with this aspect of the disclosed technology, the interface may be defined as part of an instruction set architecture. Further still, the plurality of memory hints may be configured using a memory range hint table. In addition, the memory range hint table may be implemented as an associative array, a data or instruction cache, or a page table entry and translation lookaside buffer.

Further in accordance with this aspect of the disclosed technology, the method comprises tagging the one or memory hints with a core identifier associated with the processing element.

In addition, the memory access region may be defined based on a size parameter associated with the memory access region.

As another example, an aspect of the disclosed technology is a computing device. The computing comprises a plurality of cache memories, comprising a first level cache, a second level cache and a third level cache arranged such that the second level cache provides first level data to the first level cache and the third level cache provides second level data to the second level cache; a prefetch engine coupled to prefetch data into a cache at a target level; and a memory range hint table coupled to the prefetch engine, the range hint table having a plurality of memory address hints associated with a memory address range, the plurality of memory address hints being determined based on a starting memory address and a size value associated with a memory access region that are used to specify a memory access range associated with a memory access pattern of a workload being processed by the processing element. In accordance with this aspect of the disclosed technology, the prefetch engine populates a prefetch queue based on one or more of the plurality of memory address hints.

Further in accordance with this aspect of the disclosed technology, the plurality of memory address hints may include one or more of: a stride hint indicating a constant data access distance in a data streaming the memory access region, a stream hint indicating a data access stream with reuse distances associated with the memory access region, a code hint indicating a reused code associated with processing the workload, a random access hint indicating random accesses and whether random strides associated with the memory access region are greater than or less than a cache size threshold, a spatial temporal hint indicating a likelihood of accessing neighboring cachelines associated with the memory access region at a later time than a given cache line, or a priority hint indicating a scheduling priority of data associated with a portion of the memory access region.

In accordance with this aspect of the disclosed technology, the prefetch engine populates the prefetch queue based on demand access to the plurality of cache memories and the demand misses to the plurality of cache memories. Further still, the computing device may comprise a cache controller coupled to the memory range hint table.

Further in accordance with this aspect of the disclosed technology, the cache controller decides which cacheline to evict. Further still, the memory address hints may be derived from a memory access pattern of a workload being processed by the processing element. In addition, the plurality of memory address hints may comprise an operand of an instruction in an instruction set architecture.

Further in accordance with this aspect of the disclosed technology, the prefetch engine may be coupled to receive a first input to the second level cache and the first input to the third level cache. Further still, the first input to the second level cache is supplied by a second level request queue. In addition, the prefetch queue may be coupled to the prefetch engine and the second level request queue.

Further in accordance with this aspect of the disclosed technology, the computing device may include a translation lookaside buffer (TLB) that stores translations of virtual addresses into physical addresses. Further, the computing device may include a plurality of cores that communicate with one or more of the plurality of cache memories. In addition, the prefetch engine may receive demand accesses to the second level cache and demand misses from the second level cache.

DETAILED DESCRIPTION

Figure 1:
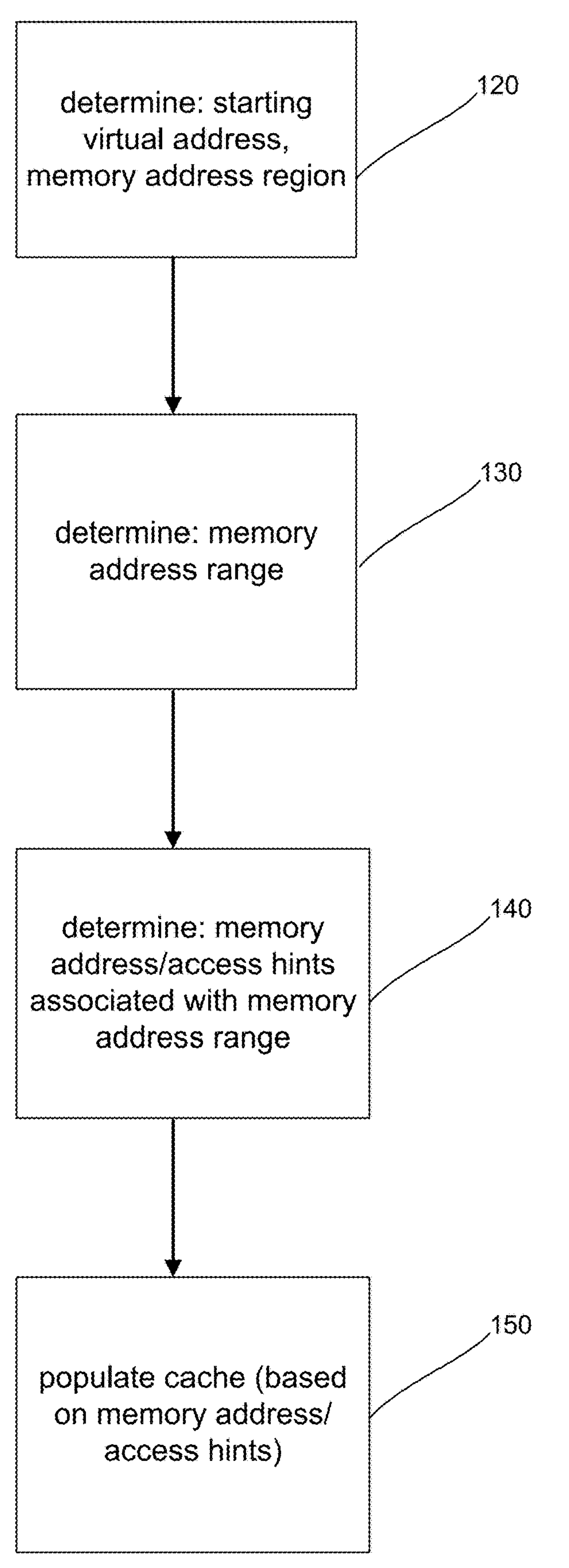
FIG. 1 discloses an example of a process or method in accordance with one or more aspects of the disclosed technology.

The disclosed technology may take the form of a process, method, apparatus, or system that improves the speed of processing data at runtime. In this regard, a single application, e.g., a Google application, can have significant diversity in its access pattern. For example, a query can touch some memory regions which have low reuse distance (e.g., rodata, tcmalloc metadata, small high-churn objects), while also streaming through some other memory (e.g., media or long strings), while also randomly accessing some memory which may have very high reuse distance (e.g., search shard data).

A possible root cause of high cache miss rate may be due to a lack of spatial locality or temporal locality. The latter is due to a high reuse distance caused by the large data working sets of the data center workloads. Generally, reuse distance refers to how many memory accesses occur between accesses to a given memory location. Depending on the type of workset (e.g., resource granularity) reuse distance may be defined contextually. For instance, cache reuse distance may be defined as the number of unique cache blocks that are accessed between two consecutive accesses of the same cacheline. For a translation lookaside buffer (TLB), reuse distance may be thought of as the number of unique memory pages that are accessed between two accesses to the same page. Depending on context, reuse distance may be described differently.

As a majority of the data accesses are short streams, discovery of data access patterns by processing such streams typically results in low access coverages. Besides, for very complex access patterns, the low precision associated with prefetching will also result in wasted CPU core energy, cache pollution, and wasted memory bandwidth. Typically, conventional cache replacement policies are also limited to known access patterns such as Last-In-First-Out/First-In-First-Out (LIFO/FIFO), but may make poor decisions when user patterns are complicated. This typically results in useful cache lines (which will soon be used) being evicted by lines that are unlikely to be used in the near future.

The disclosed technology can be used to improve the efficiency of the performance related to such operations. For instance, the disclosed technology may be implemented as a process or method for software that will be processed by hardware (e.g., one or more processors) to convey memory access patterns to the hardware so that hardware prefetchers, cache and memory controllers (MCs) can operate more efficiently.

The disclosed technology may comprise a mechanism that provides address range based memory hints, based on software memory access patterns. The mechanism includes an interface that can be in the form of a new instruction ("mem_range_hint") that includes as operands (i) the start of the virtual address ("start_vaddr"), (ii) memory region size ("size"), and (iii) a hint ("hint") associated with the memory access pattern. The new instruction provides the capability to provide range-based data access patterns to hardware elements involved in processing data, such as, for example, load-store units, all levels of caches (on-core or off-core), hardware prefetchers, and memory controllers. In addition to the new instruction, a new set of non-exhaustive memory access hints that describe the memory access range specified via the instruction are also provided.

The disclosed technology may comprise one or more software-hardware interfaces that are implementable via instruction set architecture (ISA) extensions that make use of the new memory hint machine instruction and various operands. Different implementations are possible. For example, one implementation may be configured to communicate the address range memory information to on-core caches and processor components via SRAM attached to the core. As another example, an implementation may only communicate the hints with off-core caches via a mesh network and memory controllers. In some examples, hint related information can be passed via model specific registers (MSRs) or memory mapped I/O (MMIO).

At a high level the disclosed technology can operate as follows. Initially, memory access pattern information is supplied by an application, program, or compiler. More generally, the memory access pattern is associated with a workload being processed by a processing element. The start of the virtual address ("start_vaddr") associated with the memory access pattern and size of the memory access region ("size") are determined based on the memory access pattern information. Where the region covers multiple virtual pages, the underlying region is split into multiple physical address regions with each region having a continuous physical address range.

The memory access pattern is analyzed to determine one or more of the following hints (whose descriptions, actions and parameters are discussed in further detail below):

hint_stride
hint_streaming
hint_hot_or_cold_code
hint_random_large_ws
hint_random_small_ws -continued

| |
|---|
| hint_spatially_temporal |
| hint_low_priority |

In response to a "memory_range_hint" instruction, parameters determined from analysis of the memory access pattern for "start_vaddr," "size," and for each of the foregoing hint operands are provided to the appropriate hardware components, e.g., cache, prefetcher and/or memory controller. Such hardware components then use the hint operands to provide address range based memory hints. The first operand, start_vaddr, identifies the starting virtual address of the memory address range, which can be stored in an intermediate or general register, associated with the access region. The second operand, size, specifies the access region size. The granularity of the block may be a cache line size (e.g., 64 bytes) or a hardware page size (e.g., 4 KiB, 64 KiB or 2 MiB). The third operand, hint, is an intermediate value encoding the cache line hints. The hint operand can be a bitwise OR of multiple independent hints. Additional hint specific parameters may also be encoded with the hint operand. When the address range memory information from the "mem_range_hint" instruction is passed to non-core components (such as the system-level cache or the memory controller), the range hint ("start_vaddr") can be tagged with a core-id value, e.g., start_vaddr and size. As discussed in further detail below, a special hint value is reserved to clear the existing hints for the address range.

FIG. 1 discloses an example of a process or method 100 in accordance with one or more aspects of the disclosed technology. The process 100 may be triggered automatically based on receipt of a workload for processing by a computing device. The process makes use of a memory hint instruction of the form mem_range_hint (start_vaddr, size, hint). The steps of process or method 100, or any other process or method described herein, are performed by one or more computing devices.

At step 120, the process 100 determines a starting virtual address ("start_vaddr") and memory address region associated with or based on one or more memory access patterns. The memory access pattern is associated with an application or workload being processed by a processing element (e.g., a central processing unit, processor, core). The one or more memory access patterns can be obtained from or conveyed by an application, program or compiler being used to process the workload. More generally, the memory access pattern is associated with a workload being processed by a processing element. The processing element comprises hardware that is associated with one or more load/store units, caches, prefetchers and memory that are used in processing the application data or workload. The processing element may reside in a host machine and be configured to support virtual machines or containers as part of a cloud computing platform.

As discussed above, the start of the virtual address ("start_vaddr") associated with the memory access pattern and size of the memory access region ("size") are determined based on the memory access pattern information. Using start_vaddr and size information, at step 130, a memory address range associated with the data access pattern is determined. In effect, start_vaddr and the memory access region size define the memory address range. In this regard, as previously mentioned, where the region covers multiple virtual pages, the underlying region can be split into multiple physical address regions with each region having a continuous physical address range. In such circumstances, the memory address or access range may then comprise subranges associated with each of the multiple virtual pages. In general, the software/application/workload to be processed determines the memory regions that hints will be provided for with a continuous virtual address range. If the range covers multiple pages, then the underlying physical addresses may not be continuous and thus may need to be split into multiple subranges (e.g., with one entry per subrange in the range table).

At step 140, processing proceeds by determining the memory address or access hints associated with the determined memory address range. The memory address or access hints comprise a mechanism to identify, process and categorize one or more memory access patterns. For instance, a memory access hint may comprise a [hint_stride] hint. [hint_stride] provides information about streams within the memory address/access range. For instance, [hint_stride] may provide information that indicates that data accesses in the address/access range are composed of one or multiple data streams with fixed strides (note though that strides across streams need not be identical). Put another way, [hint_stride] may comprise information indicating a constant data access distance in a data stream. In operation, [hint_stride] causes a stride prefetcher for the memory address/access range to switch on. A prefetch engine (see for example FIG. 2) issues prefetching operations that are triggered by demand misses or hits of cache lines filled by the stride prefetcher. [hint_stride] includes a prefetch-delta/offset parameter, which is computed based on the strides associated with the data streams. The strides information can be obtained via program analysis or by profiling workload data. A prefetch distance may also be specified as another parameter.

Another example of a memory address/access hint may comprise a [hint_streaming] hint. [hint_streaming] provides information indicating that access in the memory address range may have a large reuse distance (or distances) and are readily prefetchable using a simple prefetcher. In operation, [hint_streaming] causes certain actions to take place depending on certain conditions. For instance, if the reuse distance is close to or exceeds the cache capacity at the level N cache and if the memory access is a write transaction, [hint_streaming] causes caches to be skipped as levels≤N when data is flushed from the write combine buffer. Alternatively, if the reuse distance is close to or exceeds the cache capacity at the level N cache and if the memory access is a load transaction, and if there is a cache miss, then the cache line allocation is limited to only one way of the cache set (to avoid pollution). Next, requests in the MC unit and mesh network are deprioritized if marked with a low priority (as discussed further below). If the requests are not marked with low priority, the stride prefetcher is enabled. [hint_streaming] includes as parameters an estimated reuse distance (in MiB) and a stride value.

Another example of a memory address/access hint may comprise a [hint_hot_or_cold_code] hint. [hint_hot_or_cold_code] provides information indicating that the memory address range is a region of hot code expected to be reused frequently in the future. The frequency of the reuse can be a function of cache size while timing is primarily based on the number intervening memory accesses (e.g., reuse distance as discussed above). Where target information has a reuse distance that is smaller than a particular cache size, the information may be more readily kept in the cache, given that it is less likely to be evicted without being used. The information indicates the opposite when the code is cold, e.g., not expected to be reused frequently in the future. In this regard, Profile-guided Optimization techniques may be used to determine which areas of code are executed more frequently, and conversely which areas are executed less frequently. Such techniques may be used to cluster hot code or functions and place the hottest or most frequently used functions on larger memory pages, such as HugePages implemented in the Linux kernel, while leaving cold code on standard pages, such as pages that are 4 KiB in size. In operation, [hint_hot_or_cold_code] causes a cache line to be inserted in the most recently used (MRU) position for hot code. When a cache line is allocated for cold code, the cache line is inserted in the least recently used (LRU) position. Where there are multiple pending cache or MCU requests, code requests are prioritized such that hot code takes priority over cold code. [hint_hot_or_cold_code] includes a hotness_hint parameter which can be implementation dependent. For example, the hotness_hint parameter may comprise a 1 bit encoding scheme where the two available values are used to indicate hot or cold code. A 2 bit encoding scheme may be used to provide four values: cold, cool, warm, or hot. One skilled in the art should appreciate that by allocating more bits to this hint, additional levels of granularity describing the hotness/coldness of the code can be achieved (e.g., proportional to $2^n$, where n is the number of bits used).

Another example of a memory address/access hint may comprise a [hint_random_large_ws] hint. [hint_random_large_ws] provides information that indicates that random accesses in the memory address range with reuse distances that may be larger than a given or predetermined cache size threshold. In operation, [hint_random_large_ws] causes insertion of one or more newly allocated cache lines in the LRU position, bypass of caches for store operations, limit cache pollution to one direction of cache flow, and/or disable or throttle the prefetcher. [hint_random_large_ws] may include a parameter that specifies the cache against which the working set is compared against. If no value is set for the parameter, a default may cause the last level cache (LLC) size to be set as the default value.

Another example of a memory address/access hint may comprise a [hint_random_small_ws] hint. [hint_random_small_ws] in effect provides the converse of [hint_random_large_ws]. Specifically, [hint_random_small_ws] provides information that indicates that random accesses in the memory address range with reuse distances that may be equal to or smaller than the given or predetermined cache size threshold. For example, this hint may be associated with read-only data, such as .rodata, memory allocator metadata, such as tcmalloc metadata, and memory chunks backing small sized and short lived objects. In operation, [hint_random_small_ws] causes insertion of one or more newly allocated cache lines in the MRU position, prioritizing demand requests in this range in the SLC (system level cache) and potentially the MCU and/or mesh. [hint_random_small_ws] may also make use of the parameter that specifies the cache against which the working set is compared against. If no value is set for the parameter, a default may cause the last level cache L1 size to be set as the default value.

Another example of a memory address/access hint may comprise a [hint_spatially_temporal] hint. [hint_spatially_temporal] provides information that indicates that touching any cache line in a range means that one or more neighboring cache lines will be touched some time thereafter, e.g., soon thereafter. The timing associated with when a cache line might be touched (e.g., some time or soon thereafter) will typically be a function of the targeted cache size (e.g., L1/L2, etc.) and the reuse distance. In some instances, "soon" with reference to spatial locality, usually means consecutive accesses in time. More generally, cache lines in the unique cache that are touched in between two accesses should be smaller, e.g., a lot smaller, than the cache size. This hint may be associated with, for example, arenas (which are continuous memory regions for hot objects that are accessed closely in time), or large hot objects arrays (array access may be random, but each hot object or element spans multiple cache lines. In operation, [hint_spatially_temporal] causes prefetching of one or more lines before or after the lines touched (e.g., region prefetching, extension of next line prefetching) in a given transaction. [hint_spatially_temporal] may include parameters that set the number of lines to prefetch and the prefetch direction.

Another example of a memory address/access hint may comprise a [hint_low_priority] hint. [hint_low_priority] provides information about the scheduling priority for data requests associated with a region. For example, [hint_low_priority] may provide an indication that data requests in a given region have lower priority in scheduling (e.g., cache, MCU). This hint may be used with other hints to adjust behavior. Examples that may be tagged with this hint include a background thread that is compacting or asynchronously updating shard data; or a monitoring thread that is aggregating online profile data. In operation, this hint deprioritizes demand/prefetch requests within a memory address range in the presence of more than one pending request.

Each of the foregoing hints may be represented as a bitmask with a single bit set. The foregoing hints are associated with some common access patterns and not intended to be exhaustive. As shown at step 150 of the process 100 of FIG. 1, the hints are used to populate the cache. More specifically, one or more of the foregoing hints are generated in response to a mem_range_hint (start_vaddr, size, hint) instruction. The returned hints are then used to populate the cache. In this regard, note that the "mem_range_hint" instruction requires a translation lookaside buffer (TLB) (see, e.g., FIG. 5) that stores translations of virtual addresses into physical addresses. Such translation may be necessary in passing hints to application or user space.

Additional details pertaining to the logic implementing the disclosed technology include if two overlapping address ranges are marked with different hints (from the same core, or from different cores), and

- if the two address ranges are identical or the later range completely overlaps the earlier one, the later issued hint wins; or
- if the later range is strictly included in the earlier range, the earlier range is split into two with the two new subranges not overlapping with the later one; or
- otherwise the earlier range is updated with the end (or start) address adjusted to be the start (or the end) of the later range.

Figure 2:
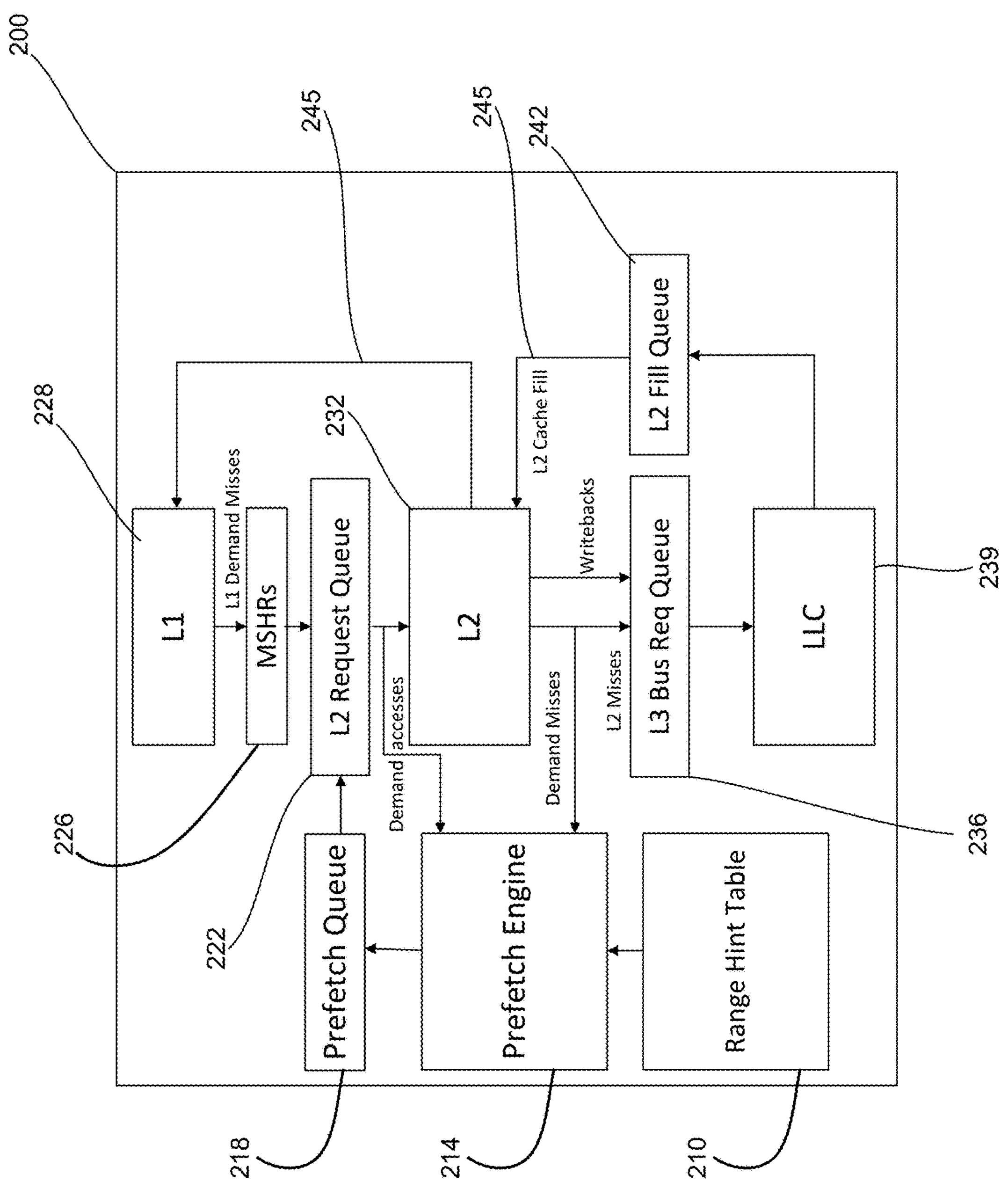
FIG. 2 shows an example of a hardware implementation of a cache in accordance with an aspect of the disclosed technology.

FIG. 2 shows an example of a possible hardware implementation 200 of a cache architecture in accordance with an aspect of the disclosed technology. This implementation 200 is an example of an on core implementation. As shown, the hardware implementation 200 comprises a range hint table 210, a prefetch engine 214 and a prefetch queue 218. The range hint table 210 stores the parameters for the operands associated with the memory_range_hint instruction. Specifically, the range hint table 210 contains fields for the (i) "start_vaddr", (ii) "size", and (iii) "hint" operands. The range hint table 210 provides parameters for the foregoing hint operands to the prefetch engine 214, which in turn uses those memory address hints to populate the prefetch queue 218.

More specifically, the range hint table 210 is coupled to and provides information to the prefetch engine 214. Prefetch engine 214 then uses this data to populate the prefetch queue 218 with data that will be used by a core, for example, to perform certain operations as part of processing a workload or a software application. The range hint table 210 will output values or information associated with the start_vaddr, size and hint operands. The hints may comprise any one of the hints discussed above, as well as other hints.

As shown, the prefetch queue 218 is coupled to an L2 request queue 222. The L2 request queue 222 is coupled to one or more missed status handling registers (MSHRs) 226, which is coupled to an L1 cache 228. The L2 request queue 222 is also coupled to an L2 cache 232. L2 cache 232 is coupled to a L3 bus request queue 236, which in turn is coupled to LLC 239. LLC 239 is also coupled to L2 cache 232 via L2 fill queue 242. L2 cache 232 is also coupled to L1 cache 228 via fill line 245.

L1 cache 228 is filled using data in L2 cache 232 via line 245. L2 cache 232 is filled with data intended for processing by a processing element from L2 fill queue 242 via fill line 247. L2 fill queue 242 receives data from LLC cache 239. What data should be prefetched and included in L2 cache 232 is based on input provided by prefetch engine 214 and based on range hint table 210. The prefetch engine 214 then provides information relating to the location of that data to prefetch queue 218. The prefetch queue 218 provides information to L2 request queue 222 that identifies the location of data that should be loaded into the L2 cache. L2 request queue 222 also receives information about demand misses generated by L1 cache 228, e.g., L1 demand misses, via MSHRs 226. Based on the information it receives from prefetch queue 218 and the L1 demand misses, L2 request queue 232 issues demand access instructions to L2 cache 232. Those demand accesses in effect cause the L2 cache 232 to be populated via L2 fill queue 242 using data in LLC 239. More specifically, those demand accesses are used by L3 bus request queue 236 to instruct LLC 239 to populate L2 fill queue 242. Essentially, read requests from L2 are put into the L3 bus request queue, while results from the L3 cache are put into the L2 fill queue.

In addition, L3 bus request queue 236 also receives L2 demand misses and writebacks from L2 cache 232. A demand miss is generally a miss by a load/store instruction. Writebacks pertain to dirty lines, which comprise lines with modified data that has not yet been flushed to a lower level cache or the RAM. When a dirty line is evicted from the cache, it needs to be flushed, which comprises a writeback operation. In this regard, the L3 bus request queue 236 and L2 fill queue 242 are used to increase parallelism so as to make better use of the available bandwidth.

As shown, the demand accesses from L2 request queue 222 are also provided to prefetch engine 214, where it is used for training the prefetch engine 214. Prefetch engine 214 also receives demand misses. In this regard, a cache miss may comprise a demand miss or a prefetch miss (e.g., a miss by a prefetch instruction or from the prefetch engine). As indicated above, range hint table 210 will provide hints based on the memory access pattern information provided by software and processed in accordance with process 100. In addition, an implementation may be designed so that the range hint table 210 chooses to ignore the mem_range_hint instruction and treat it as a NOP (i.e., no operation). An implementation can also choose to drop individual hints (e.g., when the internal range table overflows). Software can manage the number of active hints by evicting/clearing existing range hints, e.g., via a special hint value reserved to clear existing hints for a given address range.

FIG. 2 provides an example of an on core implementation. Off core implementations are also possible and may be similar to that shown in FIG. 2. For instance, in an off core implementation the range hint table may be colocated with the LLC so as to provide LLC guiding to an LLC prefetcher.

Figure 3:
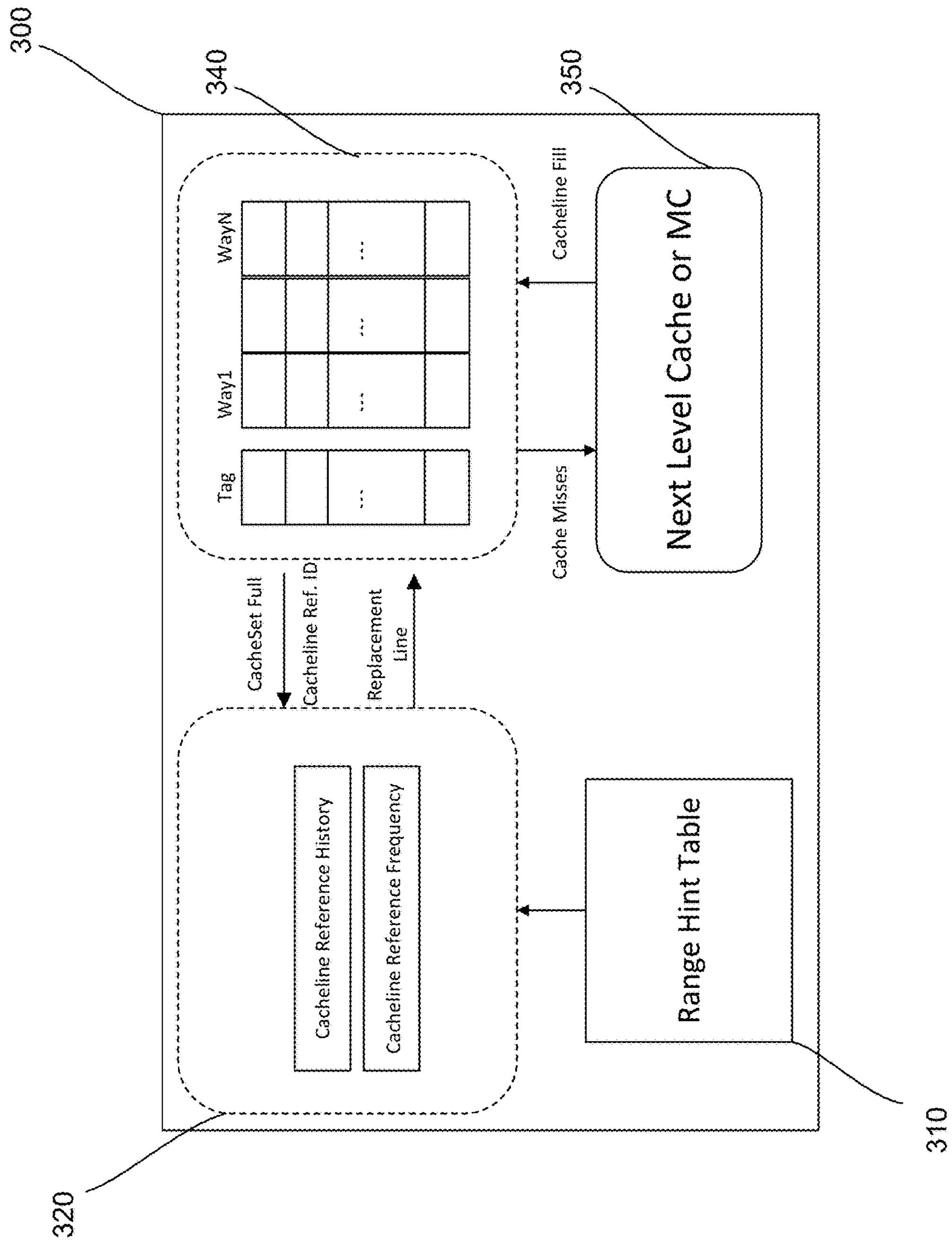
FIG. 3 shows an example implementation of a mechanism for determining whether to retain or overwrite data in a cache in accordance with an aspect of the disclosed technology.

FIG. 3 shows an example implementation 300 of how information from the range hint table 310 can be used to predict when data will be reused and therefore whether it should be retained in the cache or overwritten by data that is likely to be used sooner. As shown, the implementation includes a cache reuse predictor 320 that tracks "Cacheline Reference History" and "Cacheline Reference Frequency." The history and frequency data assisted with the range hints is used to help the cache controller (e.g., hardware that operates to copy and/or transfer information (code or data) from main memory to cache, to decide which cacheline to evict when there is a conflict miss (i.e., the smallest portion of data that can be mapped into a cache). With reference to FIG. 3, a cache controller may be coupled to cache 340 and next level cache/memory controller 350. In addition, the cache reuse predictor 320 is provided with information indicating when a cache set is full (via CacheSet Full and a Cacheline Reference ID).

As also shown in FIG. 3, the cache 340 communicates with a next level cache (e.g., L1, L2) or memory controller (MC) 350. The cache 340 includes a tag field and the storage units or blocks (rows associated with each tag in a given Way) in the cache. The tag allows the cache to translate from a cache address (e.g., tag, index, and offset) to a processing element (e.g., CPU) address. A cache hit indicates that the processing element tried to access an address, and a matching cache block was available in the cache. A cache miss indicates that the processing element tried to access a cache address, and there is not a matching cache block. As shown, cache misses are fed to the next level cache or MC 350. The next level cache or MC 350 uses the cacheline fill to populate the cache 340.

Figure 4:
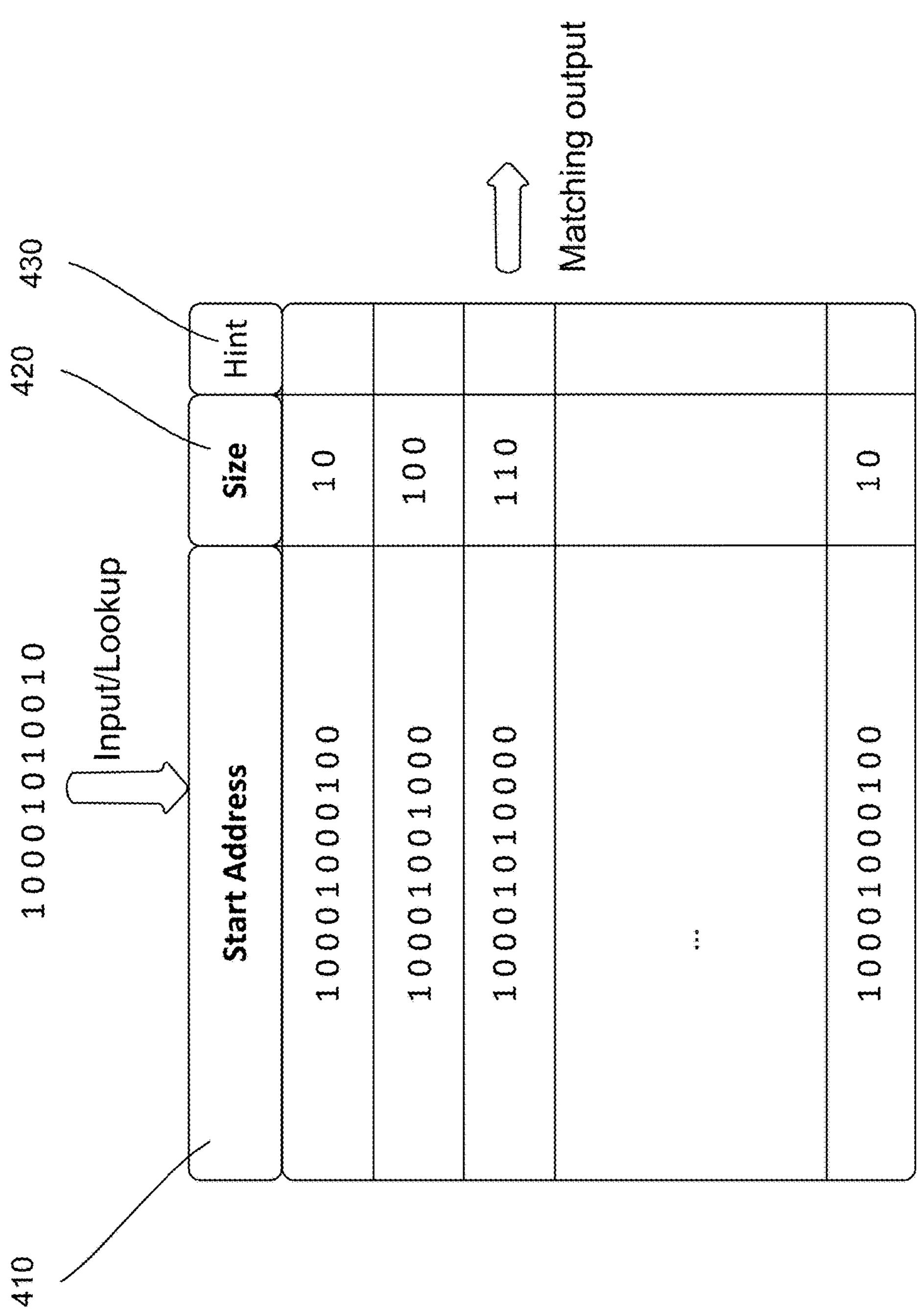
FIG. 4 illustrates an example range hint table in accordance with an aspect of the disclosed technology.

FIG. 4 illustrates an example range hint table 400. Range hint table 400 is implemented as a content addressable memory. It may also be implemented as a set associated array. It may also be implemented in TLB and a PTE (page table entry). As shown in FIG. 4, the table 400 includes a start address field 410, a size field 420 and a hint field 430. In response to receiving a start_vaddr (e.g., 10001010010) as part of the mem_range_hint instruction or request, the start address and size is used to determine the matching address range. Next, one or more hints associated with the address range are returned as shown via matching output.

Figure 5:
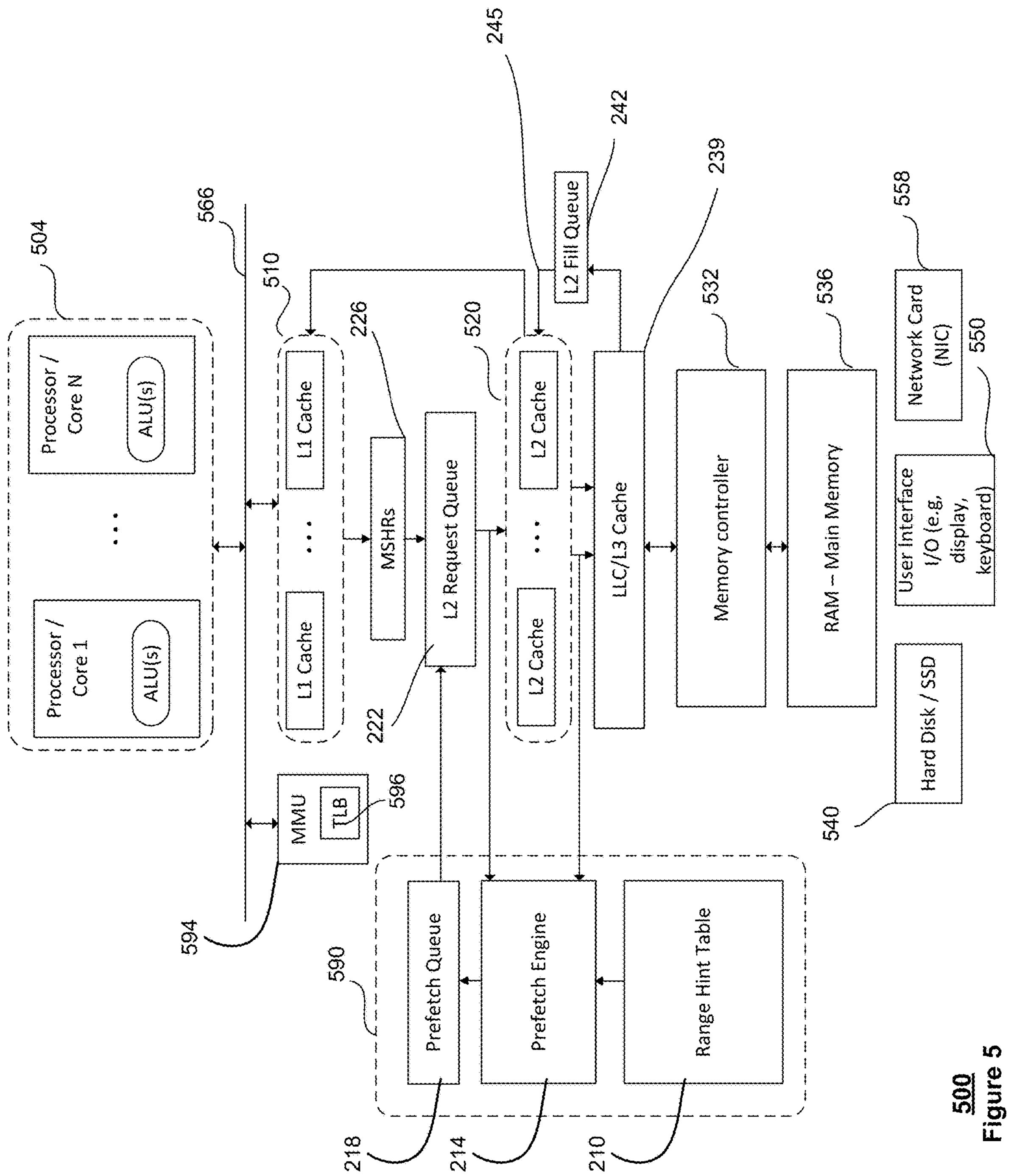
FIG. 5 shows a computing device in accordance with an aspect of the disclosed technology.

FIG. 5 shows computing device 500 in accordance with an aspect of the disclosed technology. Generally computing device 500 may be considered a control unit. Computing device 500 provides an on-core implementation similar to that shown in FIG. 2. As shown, it includes range hint table 210, prefetch engine 214, prefetch queue 218, L2 request queue 222, MSHRs 226, L3 cache 239, L2 fill queue 242, and line 245. Computing device 500 also includes a CPU 504, L1 cache 510, L2 cache 520, memory controller 532, main memory 536, a hard disk 540, user interface 550, and a NIC 558.

CPU 504 is configured as a multi-core processing device. As shown, it may include N cores or processors, generally processing elements. The cores or processors operate using logic devices such as arithmetic logic units (ALUs) that are configured to o process workloads provided to the computing device 500. In some examples, the cores or processors may be considered to be individual CPUs. Each processing element may be configured to carry out the same or a different operation on a given set of data. Such operations may take the form of instructions such as machine code or script. Such instructions may be stored as computing device code on a storage or computing device-readable medium accessible via the I/O devices. In that regard, the terms "instructions" and "programs" should be considered interchangeable herein. The instructions may be stored in object code format for direct processing by the processor, or in any other computing device language, including scripts or collections of independent source code modules that are interpreted on demand or compiled in advance.

L1 cache 510 is shown as made up of a plurality of L1 caches. The individual caches are intended to illustrate that given the multi-core computing device 504, L1 cache 510 may be used by more than one processing element at a time. In this regard, L1 cache 510 communicates with CPU 504 via bus 566. Each individual L1 cache within L1 cache 510 operates in a similar manner as L1 cache 228 shown and discussed in relation to FIG. 2. Note too, each individual L1 cache may be associated with a different core in operation.

L2 cache 520 comprises a plurality of L2 caches. The individual caches are intended to illustrate that given the multi-core computing device 504, L2 cache 520 may be used by more than one processing element at a time. In this regard, L2 cache 520 communicates with CPU 504 via bus 566. Each individual L2 cache within L2 cache 520 operates in a similar manner as L2 cache shown and discussed in relation to FIG. 2. Note too, each individual L2 cache may be associated with a different core in operation.

Computing device 500 also includes a memory controller (MC) 532 that communicates with LLC/L3 cache 239 and main memory 536. Memory controller 532 manages data transfers between the cache system and main memory 536. In some implementations, memory controller 532 may use hint information, or hint related information, to prioritize/deprioritize requests. For instance, where there are multiple cores, as shown at multi-core computing device 504, all issuing requests, the range hints could be used to arbitrate between the different cores given that bandwidth is finite, e.g., a higher priority memory access request would go before a lower priority one. In the end, all the memory access requests should be processed. Computing device 500 may also include a storage element such as hard disk 540. Hard disk 540 includes may store programs, applications, or instructions, as well as various forms of data needed to operate the computing device. User interface 550 provides access to the computing device either via a display, keyboard or other instrumentality that allows a user to access and operate computing device 500. Network interface card 558 provides access to communications networks. In some examples, computing device 500 may comprise a host machine, a server, personal computer, or computing device that is used to process data.

As shown in FIG. 5, range hint table 210, prefetch engine 214 and the prefetch queue 218 may be implemented as components of prefetch element 590. All or some of the components prefetch element 590 may be implemented using a synchronous RAM (SRAM) or other equivalent element. For example, the range hint table 210 and prefetch queue 218 may be implemented in SRAM. In some examples, the prefetch engine may be implemented as application specific circuitry (ASIC) on the computing device 500, e.g., as part of the CPU 504. Note too that FIG. 5 includes a memory management unit (MMU) 594, which includes a TLB 596, which may operate as described above.

Figure 6:
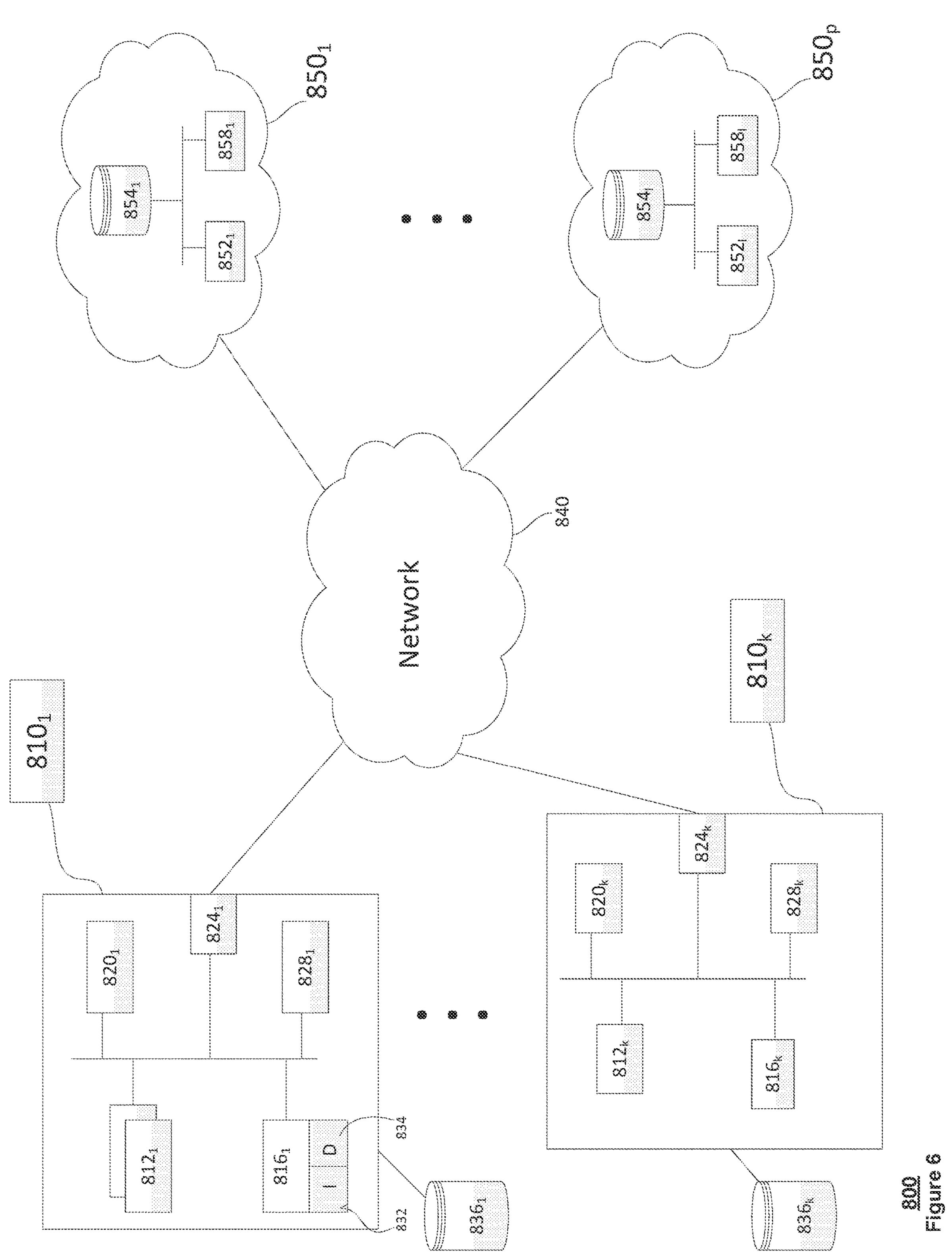
FIG. 6 illustrates a system in accordance with an aspect of the disclosed technology.

Further in that regard, computing device 500 may comprise one or more of the computing devices in system 800 of FIG. 6. System 800 includes one or more computing devices 810, which may comprise computing devices 810$_1$ through 810$_k$, storage 836, a network 840 and one or more cloud computing systems 850, which may comprise cloud computing systems 850$_1$ through 850$_p$. Computing devices 810 may comprise computing devices located at a customer location that makes use of cloud computing services such as Infrastructure as a Service (IaaS), Platform as a Service (PaaS), and/or Software as a Service (SaaS). For example, if a computing device 810 is located at a business enterprise, computing device 810 may use cloud systems 850 as a service that provides software applications (e.g., accounting, word processing, inventory tracking, etc., applications) to computing devices 810 used in operating enterprise systems. In addition, computing device 810 may access cloud computing systems 850 as part of its operations that employ machine learning, or more generally artificial intelligence technology, to train applications that support its business enterprise. For example, computing device 810 may comprise a customer computer or server in a bank or credit card issuer that accumulates data relating to credit card use by its card holders and supplies the data to a cloud platform provider, who then processes that data to detect use patterns that may be used to update a fraud detection model or system, which may then notify the card holder of suspicious or unusual activity with respect to the card holder's credit. Other customers may include social media platform providers, government agencies, or any other business that uses machine learning as part of its operations.

As shown in FIG. 6, each of computing devices 810 may include one or more processors 812, memory 816 storing data 834 and instructions 832, display 820, communication interface 824, and input system 828. The processors 812 and memories 816 may be communicatively coupled as shown in FIG. 6 and include memory controllers, queues, prefetch engine, hint table mechanisms described above. Computing device 810 may also be coupled or connected to storage 836, which may comprise local or remote storage, e.g., on a Storage Area Network (SAN), that stores data accumulated as part of a customer's operation. Computing device 810 may comprise a standalone computer (e.g., desktop or laptop) or a server associated with a customer. A given customer may also implement as part of its business multiple computing devices as servers. Memory 816 stores information accessible by the one or more processors 812. including instructions 832 and data 834 that may be executed or otherwise used by the processor(s) 812. The memory 816 may be of any type capable of storing information accessible by the processor, including a computing device-readable medium, or other medium that stores data that may be read with the aid of an electronic device, such as a hard drive, memory card, ROM, RAM, DVD, or other optical disks, as well as other write-capable and read-only memories. Systems and methods may include different combinations of the foregoing, whereby different portions of the instructions and data are stored on different types of media.

The instructions 832 may be any set of instructions to be executed directly (such as machine code) or indirectly (such as scripts) by the processor 812. For example, the instructions may be stored as computing device code on the computing device-readable medium. In that regard, the terms "instructions" and "programs" may be used interchangeably herein. The instructions may be stored in object code format for direct processing by the processor, or in any other computing device language, including scripts or collections of independent source code modules that are interpreted on demand or compiled in advance. Processes, functions, methods, and routines of the instructions are explained in more detail below.

The data 834 may be retrieved, stored, or modified by processor 812 in accordance with the instructions 832. As an example, data 834 associated with memory 816 may comprise data used in supporting services for one or more client devices, applications, etc. Such data may include data to support hosting web-based applications, file share services, communication services, gaming, sharing video or audio files, or any other network-based services.

The one or more processors 812 may be any conventional processor, such as commercially available CPUs. Alternatively, the one or more processors may be a dedicated device such as an ASIC, e.g., a tensor processing unit (TPU), or other hardware-based processor. Although FIG. 5 functionally illustrates the processor, memory, and other elements of computing device 810 as being within the same block, it will be understood by those of ordinary skill in the art that the processor, computing device, or memory may actually include multiple processors, computing devices, or memories that may or may not be located or stored within the same physical housing. In one example, one or more computing devices 810 may include one or more server computing devices having a plurality of computing devices (e.g., a load-balanced server farm) that exchange information with different nodes of a network for the purpose of receiving, processing, and transmitting the data to and from other computing devices as part of customer's business operation.

Computing device 810 may also include a display 820 (e.g., a monitor having a screen, a touch-screen, a projector, a television, or other device that is operable to display information) that provides a user interface that allows for controlling the computing device 810. Such control may include, for example, using a computing device to cause data to be uploaded through input system 828 to cloud system 850 for processing, causing accumulation of data on storage 836, or more generally, managing different aspects of a customer's computing system. While input system 828 may be used to upload data, e.g., a USB port, computing system 800 may also include a mouse, keyboard, touchscreen, or microphone that can be used to receive commands and/or data.

The network 840 may include various configurations and protocols including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi, HTTP, etc., and various combinations of the foregoing. Such communication may be facilitated by any device capable of transmitting data to and from other computing devices, such as modems and wireless interfaces. Computing device 810 interfaces with network 840 through communication interface 824, which may include the hardware, drivers, and software necessary to support a given communications protocol.

Cloud computing systems 850 may comprise one or more data centers that may be linked via high speed communications or computing networks. A given data center within system 850 may comprise dedicated space within a building that houses computing systems and their associated components, e.g., storage systems and communication systems. Typically, a data center will include racks of communication equipment, servers/hosts, and disks. The servers/hosts and disks comprise physical computing resources that are used to provide virtual computing resources such as VMs. To the extent that a given cloud computing system includes more than one data center, those data centers may be at different geographic locations within relative close proximity to each other, chosen to deliver services in a timely and economically efficient manner, as well as provide redundancy and maintain high availability. Similarly, different cloud computing systems are typically provided at different geographic locations.

As shown in FIG. 6, computing system 850 may be illustrated as comprising infrastructure 852, storage 854 and computer system 858. Infrastructure 852, storage 854 and computer system 858 may comprise a data center within a cloud computing system 850. Infrastructure 852 may comprise servers, switches, physical links (e.g., fiber), and other equipment used to interconnect servers within a data center with storage 854 and computer system 858. The servers may be equipped with the components that make up computing device 500 or 810. Storage 854 may comprise a disk or other storage device that is partitionable to provide physical or virtual storage to virtual machines running on processing devices within a data center. Storage 854 may be provided as a SAN within the datacenter hosting the virtual machines supported by storage 854 or in a different data center that does not share a physical location with the virtual machines it supports. Computer system 858 acts as supervisor or managing agent for jobs being processed by a given data center. In general, computer system 858 will contain the instructions necessary to, for example, manage the operations requested as part of a synchronous training operation on customer data. Computer system 858 may receive jobs, for example, as a result of input received via an application programming interface (API) from a customer.

Aspects of the disclosed may take the form of a method, process, apparatus, or system that includes the following combination and sub-combination of features:

F1. A method for processing data in a processing element, comprising:
- determining a starting virtual address and memory access region, the starting virtual address and memory access region defining a memory access range associated with a memory access pattern of a workload being processed by the processing element;
- determining a plurality of memory address hints associated with the memory address range; and
- populating one or more memory caches used in processing the data based on one or more of the plurality of memory address hints,
- wherein determining the starting virtual address and memory access region and determining the plurality of memory address hints are performed using an interface between software associated with the workload and the one or more memory caches.

F2. The method of feature F1, wherein the plurality of memory address hints include one or more of:
- a stride hint indicating a constant data access distance in a data streaming the memory access region,
- a stream hint indicating a data access stream with reuse distances associated with the memory access region, a code hint indicating a reused code associated with processing the workload, a random access hint indicating random accesses and whether random strides associated with the memory access region are greater than or less than a cache size threshold, a spatial temporal hint indicating a likelihood of accessing neighboring cachelines associated with the memory access region at a later time than a given cache line, or a priority hint indicating a scheduling priority of data associated with a portion of the memory access region.

F3. The method of any of features F1 and/or F2, wherein the interface is defined as part of an instruction set architecture.

F4. The method of any of features F1 through F3, wherein the plurality of memory hints are configured using a memory range hint table.

F5. The method of any of features F1 through F4, wherein the memory range hint table is implemented as an associative array, a data or instruction cache, or a page table entry and translation lookaside buffer.

F6. The method of any of features F1 through F5, comprising tagging the one or memory hints with a core identifier associated with the processing element.

F7. The method of any of features F1 through F6, wherein the memory access region is defined based on a size parameter associated with the memory access region.

F8. A computing device, comprising:

a plurality of cache memories, comprising a first level cache, a second level cache and a third level cache arranged such that the second level cache provides first level data to the first level cache and the third level cache provides second level data to the second level cache;

a prefetch engine coupled to prefetch data into a cache at a target level; and a memory range hint table coupled to the prefetch engine, the range hint table having a plurality of memory address hints associated with a memory address range, the plurality of memory address hints being determined based on a starting memory address and a size value associated with a memory access region that are used to specify a memory access range associated with a memory access pattern of a workload being processed by the processing element, and wherein the prefetch engine populates a prefetch queue based on one or more of the plurality of memory address hints.

F9. The computing device of feature F8, wherein the plurality of memory address hints including any two of a stride hint indicating a constant data access distance in a data stream in the memory access region, a stream hint indicating a data access stream with reuse distances associated with the memory access region, a code hint indicating a reused code associated with processing the workload, a random access hint indicating random accesses and whether random strides associated with the memory access region are greater than or less than a cache size threshold, a spatial temporal hint indicating likelihood of accessing neighboring cache lines associated with the memory access region at a later time than a given cache line, or a priority hint indicating a scheduling priority of data associated with a portion of the memory access region.

F10. The computing device of any of features F8 through F9, wherein the prefetch engine populates the prefetch queue based on demand access to the plurality of cache memories and the demand misses to the plurality of cache memories.

F11. The computing device of any of features F8 through F10, further comprising a cache controller coupled to the memory range hint table.

F12. The computing device of any of features F8 through F11, wherein the cache controller decides which cacheline to evict.

F13. The computing device of any of features F8 through F12, wherein the memory address hints are derived from a memory access pattern of a workload being processed by the processing element.

F14. The computing device of any of features F8 through F13, wherein the plurality of memory address hints comprise an operand of an instruction in an instruction set architecture.

F15. The computing device of any of features F8 through F14, wherein the prefetch engine is coupled to receive a first input to the second level cache and the first input to the third level cache.

F16. The computing device of feature F15, wherein the first input to the second level cache is supplied by a second level request queue.

F17. The computing device of feature F16, wherein the prefetch queue is coupled to the prefetch engine and the second level request queue.

F18. The computing device of any of features F8 through F17, comprising a translation lookaside buffer (TLB) that stores translations of virtual addresses into physical addresses.

F19. The computing device of feature F8, comprising a plurality of cores that communicate with one or more of the plurality of cache memories.

F20. The computing device of any of features F8 through F19, wherein the prefetch engine receive demand accesses to the second level cache and demand misses from the second level cache.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for processing data in a processing element, comprising:

determining a starting virtual address and memory access region, the starting virtual address and memory access region defining a memory access range associated with a memory access pattern of a workload being processed by the processing element;

determining a plurality of memory address hints associated with a memory address range associated with the memory access pattern, the plurality of memory address hints being represented as a bitmask and including a priority hint indicating a scheduling priority of data associated with a portion of the memory access region and a code hint indicating a reused code associated with processing the workload; and populating one or more memory caches used in processing the data based on one or more of the plurality of memory address hints, wherein determining the starting virtual address and memory access region and determining the plurality of memory address hints are performed using an interface between software associated with the workload and the one or more memory caches.

2. The method of claim 1, wherein the plurality of memory address hints include one or more of:

a stride hint indicating a constant data access distance in a data streaming the memory access region, a stream hint indicating a data access stream with reuse distances associated with the memory access region, a random access hint indicating random accesses and whether random strides associated with the memory access region are greater than or less than a cache size threshold, or a spatial temporal hint indicating a likelihood of accessing neighboring cachelines associated with the memory access region at a later time than a given cache line.

3. The method of claim 1, wherein the interface is defined as part of an instruction set architecture of the processing element.

4. The method of claim 1, wherein the plurality of memory hints are configured using a memory range hint table.

5. The method of claim 1, wherein the memory range hint table is implemented as an associative array, a data or instruction cache, or a page table entry and translation lookaside buffer.

6. The method of claim 1, comprising tagging the one or memory hints with a core identifier associated with the processing element.

7. The method of claim 1, wherein the memory access region is defined based on a size parameter associated with the memory access region.

8. A computing device, comprising:

a plurality of cache memories, comprising a first level cache, a second level cache and a third level cache arranged such that the second level cache provides first level data to the first level cache and the third level cache provides second level data to the second level cache;

a prefetch engine having a first input and a second input, the first input coupled to a first output of the second level cache to receive demand misses from the second level cache and the second input configured to receive demand accesses from a level request queue; and a memory range hint table coupled to the prefetch engine, the range hint table having a plurality of memory address hints associated with a memory address range, the plurality of memory address hints being determined based on a starting memory address and a size value associated with a memory access region that are used to specify a memory access range associated with a memory access pattern of a workload being processed by the processing element, and wherein the prefetch engine populates a prefetch queue based on one or more of the plurality of memory address hints.

9. The computing device of claim 8, wherein the plurality of memory address hints including any two of a stride hint indicating a constant data access distance in a data stream in the memory access region, a stream hint indicating a data access stream with reuse distances associated with the memory access region, a code hint indicating a reused code associated with processing the workload, a random access hint indicating random accesses and whether random strides associated with the memory access region are greater than or less than a cache size threshold, a spatial temporal hint indicating likelihood of accessing neighboring cache lines associated with the memory access region at a later time than a given cache line, or a priority hint indicating a scheduling priority of data associated with a portion of the memory access region.

10. The computing device of claim 8, wherein the prefetch engine populates the prefetch queue based on demand access to the plurality of cache memories and the demand misses to the plurality of cache memories.

11. The computing device of claim 8, further comprising a cache controller coupled to the memory range hint table.

12. The computing device of claim 11, wherein the cache controller decides which cacheline to evict.

13. The computing device of claim 8, wherein the memory address hints are derived from a memory access pattern of a workload being processed by the processing element.

14. The computing device of claim 8, wherein the plurality of memory address hints comprise an operand of an instruction in an instruction set architecture.

15. The computing device of claim 8, wherein the prefetch engine is coupled to receive a first input to the second level cache and the first input to the third level cache.

16. The computing device of claim 15, wherein the first input to the second level cache is supplied by a second level cache request queue.

17. The computing device of claim 16, wherein the prefetch queue is coupled to the prefetch engine and the second level request queue.

18. The computing device of claim 8, comprising a translation lookaside buffer (TLB) that stores translations of virtual addresses into physical addresses.

19. The computing device of claim 8, comprising a plurality of cores that communicate with one or more of the plurality of cache memories.

20. The computing device of claim 8, wherein the prefetch engine receive demand accesses to the second level cache and demand misses from the second level cache.

* * * * *